US012734113B2

(12) United States Patent
Berger et al.

(10) Patent No.: US 12,734,113 B2
(45) Date of Patent: Sep. 15, 2026

(54) FEEDING BOTTLE COMPRISING A COLOR CHANGE INDICATOR FOR THE PURPOSE OF TEMPERATURE CONTROL, AND USE OF SAID INDICATOR

(71) Applicant: MAPA GMBH, Zeven (DE)

(72) Inventors: Steffen Berger, Zeven (DE); Uwe Wagenknecht, Tostedt (DE)

(73) Assignee: MAPA GMBH, Zeven (DE)

( * ) Notice: Subject to any disclaimer, the term of this patent is extended or adjusted under 35 U.S.C. 154(b) by 915 days.

(21) Appl. No.: 17/778,741

(22) PCT Filed: Nov. 28, 2020

(86) PCT No.: PCT/EP2020/083816

§ 371 (c)(1),
(2) Date: May 20, 2022

(87) PCT Pub. No.: WO2021/105491

PCT Pub. Date: Jun. 3, 2021

(65) Prior Publication Data

US 2022/0409493 A1 Dec. 29, 2022

(30) Foreign Application Priority Data

Nov. 28, 2019 (EP) .................................... 19212361

(51) Int. Cl.

| | |
|---|---|
| ***A61J 9/02*** | (2006.01) |
| ***C09D 11/101*** | (2014.01) |
| ***C09D 11/50*** | (2014.01) |
| ***G01K 11/12*** | (2021.01) |

(52) U.S. Cl.
CPC ............... *A61J 9/02* (2013.01); *C09D 11/101* (2013.01); *C09D 11/50* (2013.01); *G01K 11/12* (2013.01); *G01K 2207/08* (2013.01)

(58) Field of Classification Search
CPC ........ A61J 9/02; C09D 11/037; C09D 11/101; C09D 11/50; C09K 9/02; G01K 11/12; G01K 2207/08
See application file for complete search history.

(56) References Cited

U.S. PATENT DOCUMENTS

| | | | | |
|---|---|---|---|---|
| 4,448,547 A * | 5/1984 | Wickersheim | G01K 11/3213 | 250/461.1 |
| 4,743,398 A * | 5/1988 | Brown | B41M 5/284 | 374/161 |
| 4,919,983 A | 4/1990 | Fremin | | |
| 2008/0261843 A1* | 10/2008 | Lee | C11D 1/66 | 510/141 |

(Continued)

FOREIGN PATENT DOCUMENTS

| | | | |
|---|---|---|---|
| DE | 3836424 A1 * | 7/1989 | B65D 23/16 |
| JP | H10152638 A1 * | 6/1998 | C09D 11/02 |

OTHER PUBLICATIONS

English machine translation of DE-3836424-A1 (Year: 1989).*
PCT, "International Search Report and Written Opinion" App. No. PCT/EP2020/083816, mailed Mar. 24, 2021, 11 pages.

*Primary Examiner* — Thomas J Kessler
(74) *Attorney, Agent, or Firm* — Eversheds Sutherland (US) LLP

(57) ABSTRACT

The invention relates to a feeding bottle comprising a color change indicator made of thermochromic pigments for temperature control, and the production and use thereof.

13 Claims, 1 Drawing Sheet

(56) References Cited

U.S. PATENT DOCUMENTS

Figures 1A, 1B:
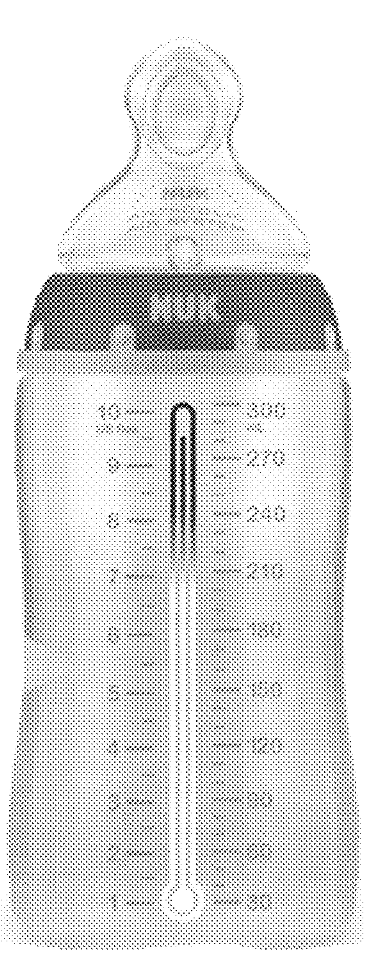

| | | | | |
|---|---|---|---|---|
| 2009/0084692 | A1 | 4/2009 | Fernandez | |
| 2012/0205386 | A1* | 8/2012 | Owen | C09D 5/26<br>524/556 |
| 2019/0269577 | A1* | 9/2019 | Reed | A61J 9/00 |
| 2019/0298616 | A1* | 10/2019 | Quintero | A61J 11/008 |
| 2020/0330330 | A1* | 10/2020 | Chenvainu | A61J 9/085 |

* cited by examiner

FEEDING BOTTLE COMPRISING A COLOR CHANGE INDICATOR FOR THE PURPOSE OF TEMPERATURE CONTROL, AND USE OF SAID INDICATOR

CROSS-REFERENCE TO RELATED APPLICATION(S)

This application is a U.S. National Stage Application under 35 U.S.C. 371 and claims the priority benefit of International Application No. PCT/EP2020/083816, filed Nov. 28, 2020, which claims the benefit of European Application 19212361, filed Nov. 28, 2019, the disclosures of which are incorporated herein by reference.

The invention relates to a feeding bottle comprising a color change indicator made of thermochromic pigments for temperature control, and the production and use thereof.

A conventional feeding bottle, also called a baby bottle, comprises a bottle teat and a refillable, circular or oval hollow bottle body, which forms a bottle base and comprises an outer thread over a bottle neck for screwing on or fitting a teat. The hollow bottle bodies are usually made of glass or preferably of thermoplastics, such as polyamide (PA), polypropylene (PP), polyethylene (PE), polyester (PES), in particular polycarbonates (PC) and polyethylene terephthalate (PET), polysulfone (PPSU), etc.

Feeding bottles of this kind are subject to specific requirements, in particular hygiene-related requirements. For example, feeding bottles are vaporized, subjected to constant heat and washing/cleaning, and are constantly and continually used for feeding babies and infants. Furthermore, feeding bottles are subjected to high mechanical stresses and are often handled a lot by babies and infants (for example, they are chewed, knocked, scratched, thrown, etc.).

Furthermore, during the intended use of a feeding bottle, in particular because of the substance filling the bottle, the surfaces of the bottle, which are regularly touched by the user, e.g. by a baby, an infant or the person feeding them, can heat up. The heat of the substance filling the bottle that is being given and the bottle surface can result in burns to the skin and the oral cavity, in particular the gums.

There is therefore great demand for a safe visual indication on a feeding bottle such that a temperature can be indicated that is higher than room temperature, in particular higher than 20 degrees Celsius (293 K.). For example, the substance filling the bottle (e.g. hot water for preparing a nutritional beverage) in a feeding bottle may have a temperature of up to approx. 70 degrees Celsius, meaning that the feeding bottle also has a temperature of approx. 70 degrees Celsius.

The prior art describes the visual display of higher temperatures on surfaces by means of thermochromic dyes. For this purpose, markings printed with thermochromic dyes or thermochromic pigments are used, for example, which undergo an irreversible color change when a certain temperature is reached (e.g. label).

CN204395022 discloses a feeding bottle comprising a thermosensitive point and scales, with thermochromic dyes being used such that the color change thereof can indicate temperatures of e.g. 40 degrees Celsius.

DE 10 2016 202 228 A1 describes the use of thermochromic pigments for visually indicating temperatures on a surface of dental instruments.

However, the additional problem is that of providing a composition of thermochromic pigments which meet the special above-described requirements of a feeding bottle; in particular, the imprint has to be integrated in the feeding bottle, has to have little propensity towards migration, has to be heat-resistant and has to be mechanically durable. Furthermore, this composition of thermochromic pigments has to be provided in a printing ink.

The present invention therefore addresses the problem of providing a particularly low-migration, heat-resistant and mechanically durable imprint of a color change indicator comprising thermochromic pigments on a feeding bottle which comprises a reliable visual indication.

Within the meaning of this invention, thermochromic pigments are insoluble inorganic and/or organic particles, meaning that the printing ink comprises a suspension of microscale solids in a liquid containing additional colorants. The pigments used are usually organic, inorganic, or crystalline powders.

The inorganic pigments are usually mineral products, such as rutile (titanium dioxide, known as white pigment) or zinc oxide. The inorganic pigments also include iridescent pigments, which are made up of mica or silica.

Organic pigments are different chemical compounds of which the basic structure is based on hydrocarbon compounds.

When the ink containing these pigment particles dries or cures, the pigment particles are intended to be wetted and enclosed by binders and retained in the printing ink. Nevertheless, the pigments can disadvantageously migrate, in particular under the ongoing effects of heat, water and high mechanical loads. This migration needs to be prevented, since the pigments can get into the contents of the bottle or get into the environment. Furthermore, during this migration, the color change indicator no longer functions, meaning that a reliable visual indication is not provided.

The pigments are often mixed with one another, such that pigments are loaded with other pigments; in particular, inorganic pigments are loaded with thermochromic dyes and organic dyes. Mixing in this way serves to produce different color values. As in the present case, thermochromic dyes can likewise be used and admixed.

So that a pigment can sufficiently realize its color intensity in a printing ink, on one hand, it has to be completely enclosed by the binder system and, on the other hand, it has to have the required fineness (=grain size of the particles), specifically, preferably a particle size of from 0.5 to 1 μm, but no greater than 10 μm.

According to the invention, a printing ink is used containing thermochromic pigments of this kind which additionally comprise thermochromic dyes besides conventional dyes.

Thermochromic pigments that behave reversibly, i.e. that return to the original color after cooling or have a low hysteresis effect, are more particularly preferred. Thermochromic pigments of this kind and thermochromic dyes are e.g. available from Sintal Chemie GmbH, Hamburg, Germany.

By means of the known thermochromic pigments and thermochromic dyes, a person skilled in the art is able to select or mix them and provide a desired color value depending on the temperature, which is in particular higher than room temperature, in particular up to 70 or 100 degrees Celsius, in particular for a temperature range of 37-45 degrees Celsius. As a result, the inherent color of the pigments can be adapted, for example (e.g. red or blue). Likewise, dyes can be used in order to modulate excitation spectra or emission spectra of the thermochromic pigments and thermochromic dyes.

Therefore, the invention relates to a method for producing a feeding bottle comprising a refillable hollow bottle body, which forms a bottle base and comprises an outer thread over a bottle neck for screwing on or fitting a teat, containing a dye change indicator for a temperature greater than 20 degrees Celsius, consisting of an imprint integrated in the bottle surface, wherein the dye change indicator is obtained from a composition comprising or consisting of:

i.) 10-30 wt. % oligomers selected from the group of polyurethane, polyester, epoxy and polyether acrylates or methacrylates, ii.) 20-40 wt. % monomers selected from the group of monofunctional, difunctional, trifunctional, tetrafunctional and hexafunctional acrylates or methacrylates, iii.) 1-10 wt. % photoinitiators, iv.) 15-35 wt. % one or more thermochromic pigments, the imprint made of the composition being obtained by means of a screen-printing process.

The inventors were surprisingly able to establish that a composition of this kind, in which the monomers and oligomers function as binders, met the above-mentioned requirements placed on a feeding bottle and solved the stated problem. In particular, the color indicator is integrated in the bottle surface as an imprint and has little propensity towards migration, is heat-resistant and is mechanically durable. Particularly preferred oligomers are polyurethane acrylate and polyester acrylate or the methacrylates thereof.

At least the following quality test was passed:

Ink Adhesion:

Tesa test and CrossCut test in accordance with DIN EN 14350

Vaporization (30 cycles)

Boiling (30 cycles)

Color Change:

after 50 cycles in the dishwasher, after being boiled for 10 minutes 30 times, after being vaporized 30 times, after 30 cycles in the bottle warmer, after the effects of sunlight (UV stability) for 40 hours of UV light (3,800 lux), after 30 cycles in the microwave (700 W, 4 minutes), after 10 cycles in the microwave (1,000 W, 0.5 minutes), after 30 cycles in the microwave steam vaporizer.

In particular, the composition according to the invention can advantageously be used in a screen-printing process. The screen-printing process is therefore advantageous since the inventors were able to establish that the gentle and uniform application meant that the lowest migration of the thermochromic pigments was expected, since the selected binders completely wet the thermochromic pigments particularly gently in the presence of the above-mentioned composition and can comprehensively surround said pigments.

The invention therefore likewise relates to a method for producing a feeding bottle comprising a refillable hollow bottle body, which forms a bottle base and comprises an outer thread over a bottle neck for screwing on or fitting a teat, containing a dye change indicator for a temperature greater than 20 degrees Celsius, consisting of an imprint integrated in the bottle surface, wherein the dye change indicator is obtained from a composition comprising or consisting of:

i.) 10-30 wt. % oligomers selected from the group of polyurethane, polyester, epoxy and polyether acrylates or methacrylates, ii.) 20-40 wt. % monomers selected from the group of monofunctional, difunctional, trifunctional, tetrafunctional and hexafunctional acrylates or methacrylates, iii.) 1-10 wt. % photoinitiators, iv.) 15-35 wt. % one or more thermochromic pigments, the imprint made of the composition being obtained by means of a screen-printing process.

In another preferred embodiment, the thermochromic pigments additionally comprise thermochromic dyes selected from the group of:

a.) organic thermochromic dyes, which change color by way of a structural change when the temperature changes, preferably those such as 9,9'-bixanthylidene and 10,10'-bian-thronylidene;

b.) combinations of a leuco dye (e.g. spirolactones, spiropyrans) and a reversible proton donor (e.g. bisphenol A, 1,2,3-triazoles) and a phase-change material (e.g. paraffin), which change the color by protonating/deprotonating the leuco dye when the temperature changes;

c.) dyes or metal complexes, including chelates, which change their color intensity in a temperature-dependent manner, e.g. temperature quenching for europium complexes, and d.) combinations of a plurality of dyes having different temperature behavior (e.g. a mixture of terbium, europium, samarium, gadolinium, and neodymium complexes, and many others).

The invention therefore likewise relates to thermochromic pigments of this kind, which are loaded with a thermochromic dye and comprise additional dyes in a printing ink.

When the thermochromic pigments are being wetted and enclosed, as described above, their loading with the thermochromic dyes can also be fixed and they can be prevented from diffusing.

Furthermore, it is preferable for the feeding bottle to consist of at least one thermoplastic and for this thermoplastic together with the composition according to the invention to be activated with UV light to obtain the imprint.

In addition, it is preferable for the feeding bottle to consist of glass and for this glass together with the composition according to the invention to be activated with UV light to obtain the imprint.

Furthermore, the feeding bottle can comprise a first clear coating. In addition, it is preferable for the UV light to likewise be used to cure the imprint.

The screen-printing process requires short times for integrating the color change indicator as an imprint in the bottle surface in a printing ink in a rotating feeding bottle.

In the context of this invention, a screen-printing process is a process in which the image carrier consists of a frame that is covered with a fabric/screen. A stencil is attached to the fabric/screen. The stencil prevents the dye from being applied to those points in the printed image, and specifically the color change indicator as an imprint in the bottle surface in a printing ink, that are not to be printed. The printed image, and specifically the color change indicator as an imprint in the bottle surface in a printing ink, is produced at the open points in the stencil.

The image carrier is attached to a heated, rotating feeding bottle in a printing machine. The printing ink according to the invention is then applied to the fabric/screen and is evenly spread (doctored) onto the material through the open points in the stencil using a rubber doctor blade. The color is printed through the meshes of the fabric/screen and is applied to the surface of the feeding bottle. After the printing, the printed feeding bottle is removed from the machine and left to dry.

In another preferred embodiment, the composition comprises 1-5 wt. % additives, in particular selected from the group of leveling agents, defoamers, dispersing agents, and substrate wetting agents.

Furthermore, the photoinitiators (here, radical formers) are preferably selected from the group of phosphine oxide derivatives, thioxanthones, and acetophenone derivatives, which can be activated by light, in particular UV light, and activate the monomers and oligomers set out according to the invention for the polymerization.

In another preferred embodiment, the feeding bottle is a thermoplastic, in particular selected from polyamide (PA) or polypropylene (PP), the lateral surface of the bottle, which connects the bottle base to the bottle neck, having a thickness of from 0.7 to 1.5 mm.

In another preferred embodiment, the feeding bottle is made of glass, the lateral surface of the bottle, which connects the bottle base to the bottle neck, having a thickness of 2 mm.

The positive printed image, and specifically the color change indicator as an imprint in the bottle surface, can be in various shapes or symbols, in particular in the shape of a warning symbol, such as a warning triangle, an exclamation mark, or in the shape of a thermometer, optionally having a scale. The color change on the feeding bottle takes place within a desired temperature zone, preferably at 37-45 degrees Celsius. The invention therefore relates to a feeding bottle having a use for visually indicating the risk of scalding, wherein the dye change indicator indicates a temperature greater than 37 degrees Celsius.

Furthermore, it is preferable for the color to change from e.g. blue to red, or from blue to colorless, with the original color being (reversibly) visible again each time the bottle cools down.

Furthermore, it is preferable for the printed image to be in at least one elongate shape from the bottle base up to the bottle neck, in particular in the shape of a bar or a line, which is solid or discontinuous, and optionally is designed to form dots and circles or other symbols.

This embodiment is particularly advantageous if the feeding bottle is tipped up, when the hot substance inside migrates to the bottle neck for drinking or the bottle is refilled with the substance.

Furthermore, it is preferable for three or four such printed images to each be printed at a spacing of 120 degrees or 90 degrees on the round or oval bottle surface.

DRAWINGS

FIG. 1*a*: Feeding bottle (empty)

FIG. 1*b*: Feeding bottle filled with a hot substance, with the imprint displaying the color change.

The invention claimed is:

1. A feeding bottle comprising a refillable hollow bottle body, which forms a bottle base and comprises an outer thread over a bottle neck for screwing on or fitting a teat, the feeding bottle containing a dye change indicator for a temperature greater than 20 degrees Celsius, the dye change indicator consisting of an imprint integrated in a bottle surface, characterized in that the dye change indicator is obtained from a composition comprising:

i.) 10-30 wt. % oligomers selected from the group consisting of acrylates and methacrylates of polyurethane, polyester, epoxy, and polyether, ii.) 20-40 wt. % monomers selected from the group consisting of monofunctional, difunctional, trifunctional, tetrafunctional, and hexafunctional acrylates or methacrylates, iii.) 1-10 wt. % photoinitiators, iv.) 15-35 wt. % one or more thermochromic pigments, wherein the thermochromic pigments include an organic thermochromic dye and optionally one or more thermochromic dyes selected from the group consisting of a combination of a leuco dye, a reversible proton donor, and a phase-change material; a dye or a metal complex; and a combination of a plurality of dyes having different temperature behaviors, the imprint made of the composition being obtained by means of a screen-printing process, wherein the organic thermochromic dye is 9,9'-bixanthylidene or 10,'10-bian-thronylidene.

2. The feeding bottle according to claim 1, characterized in that the feeding bottle further comprises at least one thermoplastic, wherein the thermoplastic and the composition are activated with UV light to obtain the imprint and are cured by means of UV light.

3. The feeding bottle according to claim 2, characterized in that at least one thermoplastic is selected from the group consisting of polyamide (PA), polypropylene (PP), polyester (PES), and polysulfone (PPSU).

4. The feeding bottle according to claim 1, characterized in that the feeding bottle further comprises glass, and wherein the composition is activated with UV light to obtain the imprint and is cured by means of UV light.

5. The feeding bottle according to claim 1, characterized in that the composition contains 1-5 wt. % additives selected from the group consisting of leveling agents, defoamers, dispersing agents, and substrate wetting agents.

6. The feeding bottle according to claim 1, characterized in that the photoinitiators are selected from the group consisting of phosphine oxide derivatives, thioxanthones, and acetophenone derivatives.

7. The feeding bottle according to claim 1, characterized in that a printed image formed from the imprint is in the shape of a warning symbol.

8. The feeding bottle according to claim 1, characterized in that a printed image formed from the imprint is in at least one elongate shape from the bottle base up to the bottle neck, in the shape of a bar or a line or in the form of a thermometer, with each of these having a scale, being solid or being discontinuous.

9. The feeding bottle according to claim 1, wherein the leuco dye is spirolactone or spiropyrans, the reversible proton donor is bisphenol A or 1,2,3-triazoles, and the phase-change material is paraffin.

10. The feeding bottle according to claim 1, wherein the dye or the metal complex is configured to change color intensity in a temperature dependent manner.

11. The feeding bottle according to claim 1, wherein the combination of a plurality of dyes having different temperature behavior include a mixture of two or more of terbium, europium, samarium, gadolinium, and neodymium complexes.

12. A method for producing a feeding bottle comprising a refillable hollow bottle body, which forms a bottle base and comprises an outer thread over a bottle neck for screwing on or fitting a teat, the feeding bottle containing a dye change indicator for a temperature greater than 20 degrees Celsius, the dye change indicator consisting of an imprint integrated in a bottle surface, characterized in that the dye change indicator is obtained from a composition comprising or consisting of:

i.) 10-30 wt. % oligomers selected from the group consisting of acrylates and methacrylates of polyurethane, polyester, epoxy, and polyether, ii.) 20-40 wt. % monomers selected from the group consisting of monofunctional, difunctional, trifunctional, tetrafunctional, and hexafunctional acrylates or methacrylates, iii.) 1-10 wt. % photoinitiators, iv.) 15-35 wt. % one or more thermochromic pigments, wherein the thermochromic pigments include an organic thermochromic dye and optionally one or more thermochromic dyes selected from the group consisting of a combination of a leuco dye, a reversible proton donor, and a phase-change material; a dye or a metal complex; and a combination of a plurality of dyes having different temperature behaviors, the imprint made of the composition being obtained by means of a screen-printing process, wherein the organic thermochromic dye is 9,9'-bixanthylidene or 10,'10-bian-thronylidene.

13. Use of a feeding bottle according to any of claim 12 for visually indicating the risk of scalding, wherein the dye change indicator indicates a temperature greater than 37 degrees Celsius.

* * * * *